June 3, 1930.  F. GRENZER  1,762,017
METHOD OF MANUFACTURE OF SQUIRREL CAGE ROTORS FOR ELECTRIC MACHINES
Filed Oct. 18, 1927   4 Sheets-Sheet 1

Inventor
Ferdinand Grenzer
By Knight Bros
Attys

June 3, 1930.   F. GRENZER   1,762,017
METHOD OF MANUFACTURE OF SQUIRREL CAGE ROTORS FOR ELECTRIC MACHINES
Filed Oct. 18, 1927   4 Sheets-Sheet 4
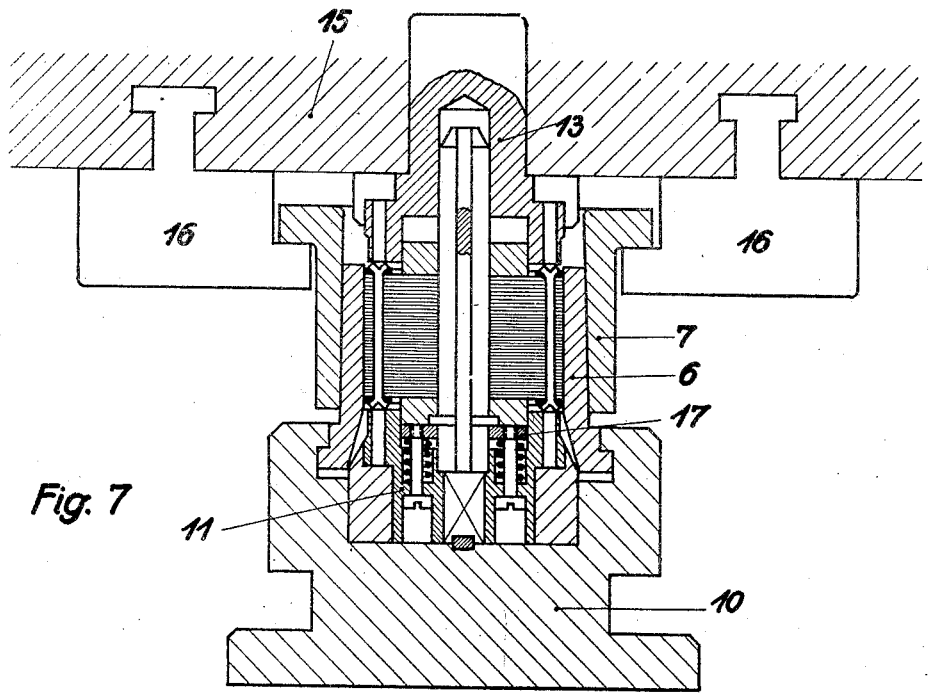
Fig. 7
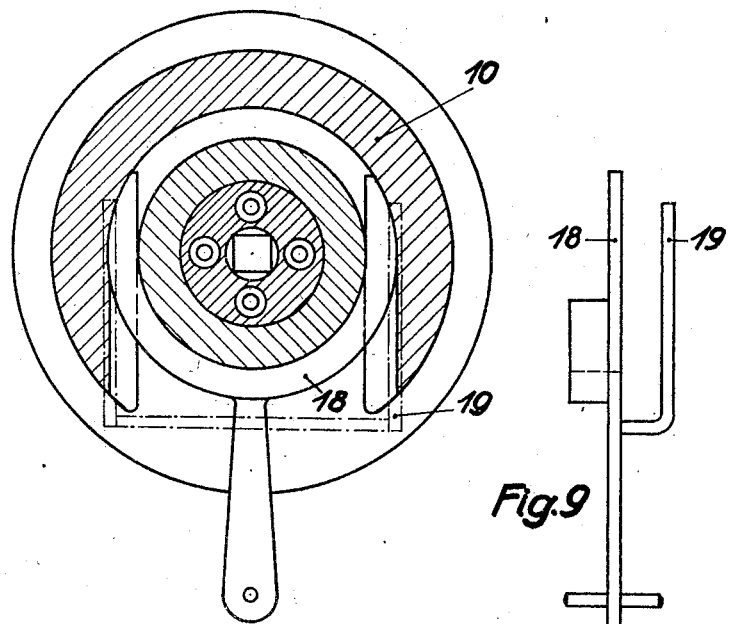
Fig. 8
Fig. 9
Inventor
Ferdinand Grenzer
By Knight Bros
Attys Patented June 3, 1930

1,762,017

UNITED STATES PATENT OFFICE

FERDINAND GRENZER, OF CANNSTATT-STUTTGART, GERMANY, ASSIGNOR TO MASCHIN-ENFABRIK ESSLINGEN, OF ESSLINGEN, GERMANY

METHOD OF MANUFACTURE OF SQUIRREL-CAGE ROTORS FOR ELECTRIC MACHINES

Application filed October 18, 1927, Serial No. 227,010, and in Germany November 1, 1926.

It is a condition for good operation for alternating current squirrel cage motors that between the bars and the end rings of the squirrel cage, a good contact should be continuously maintained. This requirement has led to mere riveting of the rods with the rings being given up and soft soldering, or still better, hard soldering being employed. Hard soldering is very expensive in material and wages and also, in carrying out the operation, the copper is often burnt and made brittle; on the other hand soft soldered rotors break down when overloaded and the melting temperature of the soft solder has been reached.

The drawbacks of these well-known methods are avoided, according to the invention, by only riveting the rods with the rings and maintaining the contact by the manner and the degree of pressure of the laminations and by the resilience of the pressed laminations, even on heating and cooling and in the event of mechanical or magnetic vibrations. The rotor is also manufactured, without handwork, completely by mechanical means, which favourably affects its cost and ensures uniformity and quality.

The invention is illustrated in the accompanying drawings, wherein

Figure 7 is a sectional elevation of the riveting press of Figure 5 showing the rotor after riveting has been completed.

Figures 8 and 9 show in plan and side view an implement employed in the invention.

Figure 1:
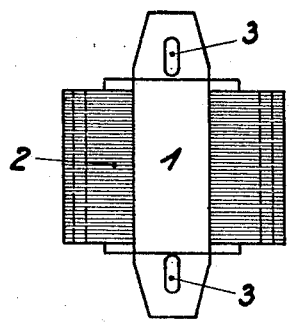
Figure 1 shows diagrammatically in a cross-sectional view showing the stacking of the laminations.
Figure 2:
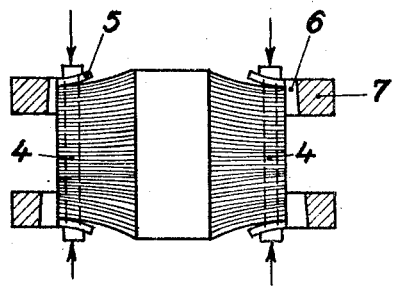
Figure 2 illustrates the riveting of the bars to the end rings.
Figure 3:
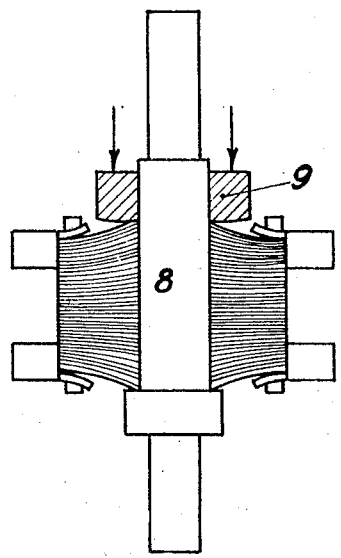
Figure 3 is a cross-section of the rotor after insertion of the shaft.

Figures 1 to 3 show diagrammatically successive working operations in the manufacture of the rotor. The laminations 2 stacked on the temporary mandrel 1 are preliminarily subjected to pressure and held together by wedges 3. The sheets are stamped out with a central opening intended to take the shaft or boss and with a projection intended to fit a keyway in the shaft. Then the copper rods 4 are inserted in the slots and the short-circuiting or end rings 5, which are provided with apertures and appropriately cut, fitted. The two-part collars 6 are placed about the short-circuiting rings and over these the pressure rings 7 are drawn and the riveting effected by pressure. Simultaneously with the riveting, the end rings are also closed. There is thus obtained a bundle of laminations pressed together on the outer periphery as is shown in an exaggerated manner in Figure 2. Figure 3 shows the rotor during the third working operation; the shaft 8 is inserted, the ring 9 is pressed on the shaft or rotor boss, so that the laminated body of the armature is compressed also on the inner diameter and the initial tension at the outer periphery therefore increased. In order that the shaft shall not be bent in this operation, the front surface of the pressure ring is not turned with a plain surface but is spherical or conical, that is to say, so that it only makes contact on a line.

An essential feature of the method of manufacture is that both in the working operation according to Figure 2, as well as that according to Figure 3, the pressing is not carried out so as to obtain a predetermined width of iron but until a desired pressure has been obtained in kilograms per square centimetre. Small differences in the width of iron are in this case put up with and by trial of the number or the weight of the sheets very soon limited to a minimum degree.

Figure 4:
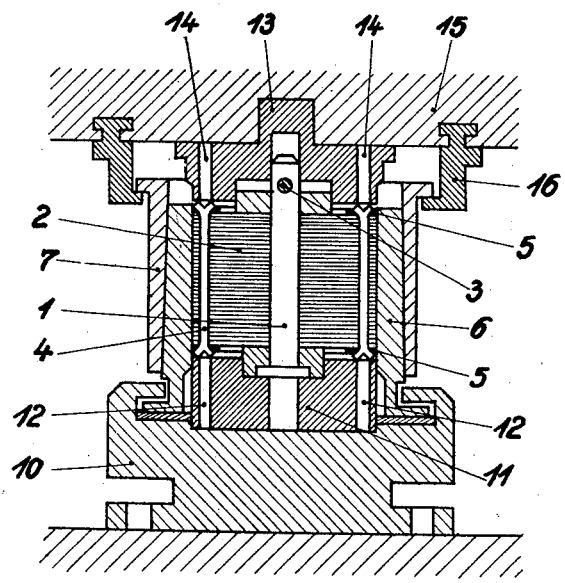
Figure 4 is a sectional elevation of the riveting press with the rotor in position.
Figure 5:
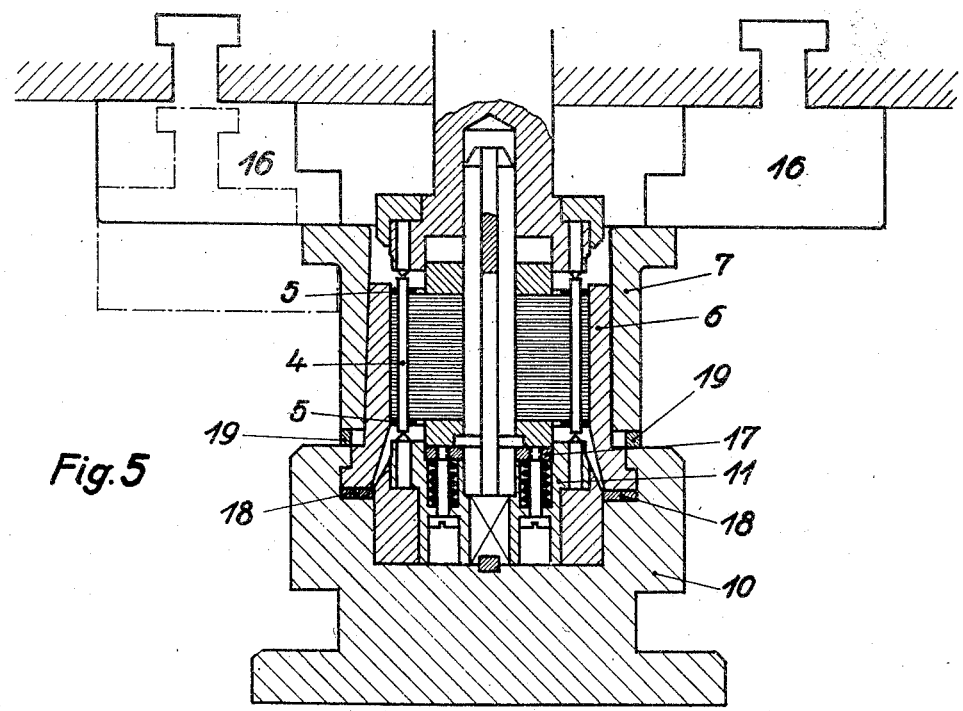
Figure 5 is a sectional elevation of a modified riveting press showing the rotor before riveting.
Figure 6:
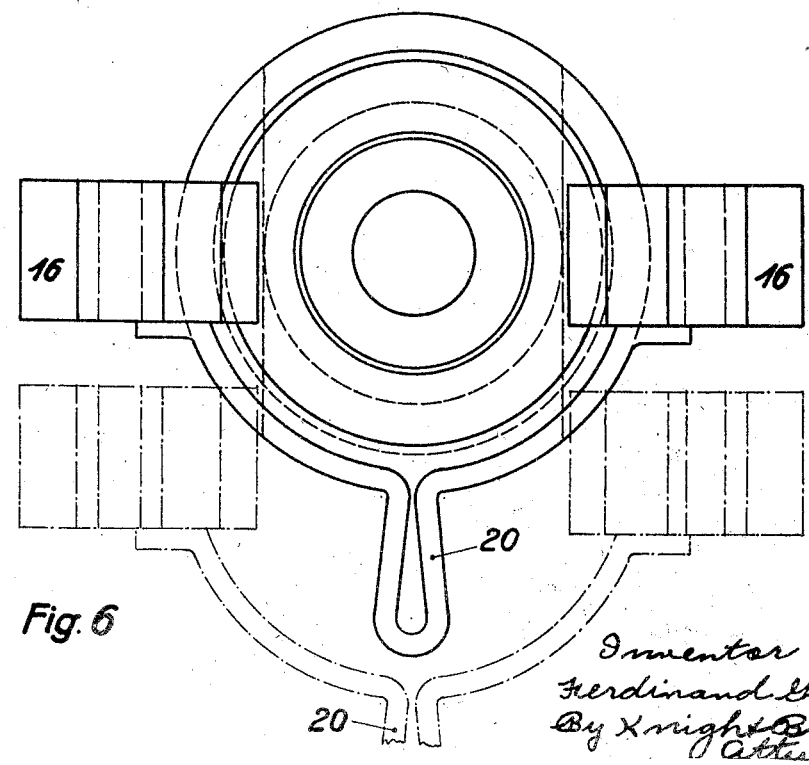
Figure 6 is a plan view of the press shown in Figure 5.

The riveting device, Figure 4, consists in its essential parts of a movable base plate 10 which carries the lower press-head 11 and the riveting punches 12 located in same, and the upper riveting head 13 located in the upper part 15 of the frame which carries the same number of riveting punches 14. For joining up the end rings, which are wound spirally edgewise, at their junctions, further riveting punches which are not shown in the drawings are mounted in the two riveting heads at these places.

The bundle of laminations 2, previously pressed with temporary mandrel 1 and wedges 3, in which the squirrel cage rods 4 and the end rings 5 have been inserted, is placed centrally on the press-head 11 and after applying the two-part sleeve 6, which has a conical external surface, is pushed into the baseplate 10, which is open on one side, whereupon the one part pressure sleeve 7 which is conical inside, is applied. The number of riveting punches 12 and 14 corresponds to the number of squirrel cage rods, which are positioned coaxially with the opposite riveting punches. It is, however, possible to employ fewer riveting punches and to rivet the squirrel cage rods in successive sections, attention being paid to the fact that it is always necessary to rivet at the same time rods located diagonally opposite one another.

The baseplate 10 with bundle of laminations etc., is pressed with a hammer blow against the upper press-head by means of a suitable press device, for example, a friction spindle press, an eccentric press or press lifted by compressed air or hydraulic pressure. By this means the squirrel cage rods 4 and the end rings 5 are riveted. Immediately thereafter lugs 16 engage below the flange of the pressure sleeve 7 and hold the same firmly so that after finishing the riveting operation, it is drawn away whilst the baseplate 10 again moves downwards. By this means the finished rotor is released and can be taken out of the device in order to remove the temporary mandrel 1 with wedge 3 so that the shaft can be inserted as set forth in our copending application No. 227,011.

The working can also be effected in the manner that the lower part of the press remains stationary and the upper press-head is moved against it like a hammer or in such a way that both parts either vertically or horizontally are simultaneously moved towards one another.

A modified form of the riveting press is shown in Figures 5 to 8, Figure 5 showing the press before riveting and Figure 7 the press after riveting the squirrel cage rods. In this arrangement a resilient plate 17 is inserted in the lower press-head 11 for supporting the bundle of laminations, so that the latter can give during the riveting. In order to take account of the alteration in length caused by the formation of the rivet heads, on mounting the bundle of laminations a distance fork, for example, (Figures 8 and 9), is inserted which on the one hand by its arm 18 determines the distance between the baseplate 10 and the two-part sleeve 6; on the other hand by its arms 19 it determines the distance between the baseplate and the pressure sleeve 7 before commencing the riveting. After applying the sleeve 7, which is pressed by the lugs 16, the distance fork is again removed, so that the arrangement now possesses the necessary play for the riveting operation.

In place of the distance fork, a suitable resilient or eccentrically movable intermediate spacer can also be employed.

The lugs 16, in place of which also separate stops may be employed, are, after pressing the pressure sleeve 7, drawn out with the aid of the handle 20 (Figure 6) and after the riveting has been effected their projections are again inserted below the flange of the pressure sleeve 7 so that the latter, as above-mentioned, can be drawn out of the press.

I claim:

1. The method of manufacture of squirrel cage rotors for electric machines, which consists in compressing a stack of laminations to a predetermined pressure, mounting the short-circuitings rings and squirrel cage rods and riveting said rods over said rings.

2. The method of manufacture of squirrel cage rotors for electric machines, which consists in compressing a stack of laminations to a predetermined pressure on a temporary mandrel, placing the short-circuiting rings and squirrel cage rods in position, riveting said rods over said rings, and replacing the temporary mandrel by the rotor shaft.

3. The method of manufacture of squirrel cage rotors for electric machines, which consists in compressing a stack of laminations to a predetermined pressure on a temporary mandrel, placing the short-circuiting rings and squirrel cage rods in position, riveting over all said rods simultaneously and replacing the temporary mandrel by the rotor shaft.

4. The method of manufacture of squirrel cage rotors for electric machines, which consists in compressing a stack of laminations to a predetermined pressure, placing the short-circuiting rings and squirrel cage rods in position, riveting said rods over said rings, and restraining the laminations and short-circuiting rings against radial expansion during the riveting process.

5. The method of manufacture of squirrel cage rotors for electric machines, which consists in compressing a stack of laminations to a predetermined pressure, placing split short-circuiting rings and squirrel cage rods in position, riveting said rods over said ring, and simultaneously closing the split short-circuiting rings during the latter operation.

6. The method of manufacture of squirrel cage rotors for electric machines, which consists in compressing a stack of laminations to a predetermined pressure on a temporary mandrel, placing the short-circuiting rings and squirrel cage rods in position, riveting over said rods, replacing the temporary mandrel by the rotor shaft and compressing the laminations at the centre between clamping rings on said shaft.

7. The method of manufacture of squirrel cage rotors for electric machines, which consists in compressing a stack of laminations to a predetermined pressure, placing the short-circuiting rings and squirrel cage rods in position, fitting around the stack of laminations and short-circuiting rings a multi-part sleeve having a conical outer surface, slipping over said sleeve a one part sleeve having a conical inner surface complementary to the outer surface of said multi-part sleeve, and then riveting said rods over said rings.

In testimony whereof I have affixed my signature.

FERDINAND GRENZER.